US010818148B2

(12) United States Patent
Yajima

(10) Patent No.: US 10,818,148 B2
(45) Date of Patent: Oct. 27, 2020

(54) SALES REGISTRATION APPARATUS

(71) Applicant: TOSHIBA TEC KABUSHIKI KAISHA, Tokyo (JP)

(72) Inventor: Shinsuke Yajima, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/291,382

(22) Filed: Mar. 4, 2019

(65) Prior Publication Data

US 2019/0272714 A1 Sep. 5, 2019

(30) Foreign Application Priority Data

Mar. 5, 2018 (JP) ................................ 2018-039067

(51) Int. Cl.

*G06K 15/00* (2006.01)
*G07G 1/00* (2006.01)
*A47F 9/04* (2006.01)
*G07G 1/12* (2006.01)

(52) U.S. Cl.

CPC ........... *G07G 1/0018* (2013.01); *A47F 9/046* (2013.01); *G07G 1/12* (2013.01)

(58) Field of Classification Search

USPC .......................................................... 235/383
See application file for complete search history.

(56) References Cited

U.S. PATENT DOCUMENTS 4,963,721 A 10/1990 Kohno et al.
7,000,833 B2 * 2/2006 Sato ........................ A47F 9/046 186/59
7,866,546 B1 * 1/2011 Vance ...................... G07G 1/14 235/379
2002/0038820 A1 * 4/2002 Check .................... G02B 26/10 235/462.14
2009/0072039 A1 3/2009 Yamada et al.
2013/0256395 A1 * 10/2013 Barkan .................. G06Q 20/00 235/375
2018/0032028 A1 * 2/2018 Watatani ............ G03G 21/1685

FOREIGN PATENT DOCUMENTS

GB 2535970 A 9/2016
JP 2010257120 A 11/2010

OTHER PUBLICATIONS

Extended European Search Report dated Jun. 18, 2019 mailed in counterpart European Application No. 19160704.3, 8 pages.

* cited by examiner

*Primary Examiner* — Tuyen K Vo
(74) *Attorney, Agent, or Firm* — Kim & Stewart LLP

(57) ABSTRACT

A sales registration apparatus includes a reader to read information from a commodity and a main body on an upper surface of a checkout counter. The main body houses the reader and comprises a plurality of side surface regions distributed adjacently along a side surface in a height direction of the main body. A plurality of cover sections including panel surfaces having a planar dimension substantially matching a planar dimension of least one of the plurality of side surface regions. An attachment section in each of the plurality of side surface regions and configured to permit attachment of a corresponding cover section in the plurality of cover sections in a detachable manner. At least two of the side surface regions have the same size such that a cover section matching one of will also match the other of the at least two side surface regions.

19 Claims, 8 Drawing Sheets

SALES REGISTRATION APPARATUS

CROSS-REFERENCE TO RELATED APPLICATION

This application is based upon and claims the benefit of priority from Japanese Patent Application No. 2018-039067, filed in Mar. 5, 2018, the entire contents of which are incorporated herein by reference.

FIELD

An embodiment described herein relates generally to a sales registration apparatus.

BACKGROUND

There is used a checkout system in which a sales registration apparatus that performs registration commodities and an accounting apparatus that executes settlement processing on the basis of sales registration data from the sales registration apparatus are connected by a network. In such a checkout system, a configuration in which multiple store clerks handle registration and settlement (a two-person work type) and a configuration in which a customer handles the settlement (a semi-self service type) can be adopted.

In the checkout system, a sales registration apparatus of a type called a vertical scanner is used for space saving and the like. In a vertical, there is a configuration in which a reading device and the like are housed in a main body section erected on a checkout counter and a display device is provided above the main body section. In the vertical scanner, a side surface of the main body section is covered by a single cover member to protect the main body section and improve designability. A sales registration apparatus with an accessory such as a metal plate attached to a part of a side panel is used such that a notice can be posted using a magnet.

However, with this configuration in the past, methods of attachment to the side surface of the main body section is limited and flexibility of in layout is low since the cover member is a single member. That is, for example, since the cover member is fixed to the side surface of the main body section, a setting height of the metal plate cannot be easily changed. Work for repositioning the metal plate or reinstalling the metal plate in another location would be necessary.

DETAILED DESCRIPTION

In general, according to one embodiment, a sales registration apparatus comprises a reader configured to read information from a commodity. A main body is on an upper surface of a checkout counter and houses the reader. The main body comprises a plurality of side surface regions distributed adjacently along a side surface in a height direction of the main body. A plurality of cover sections including panel surfaces having a planar dimension substantially matching a planar dimension of least one of the plurality of side surface regions are provided. An attachment section is provided in each of the plurality of side surface regions and is configured to permit attachment of a corresponding cover section in the plurality of cover sections in a detachable manner. At least two of the side surface regions have a same size such that a cover section matching one will also match the other of the at least two side surface regions.

A sales registration apparatus according to an example embodiment is explained below with reference to the accompanying drawings. In the examples explained below, a sales registration apparatus used in checkout systems of a two-person work type, a semi-self service type, and the like is explained. However, embodiments are not limited to this example.

Figure 1:
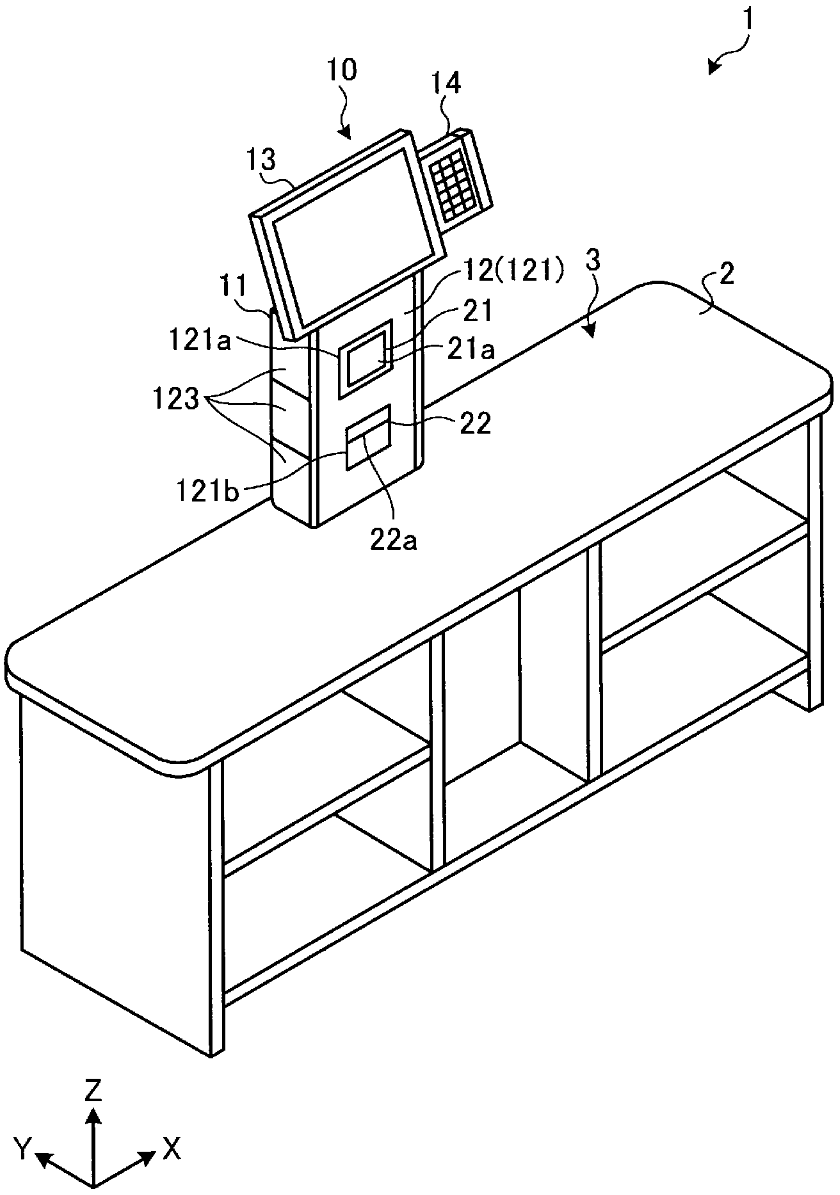
FIG. 1 is a perspective view illustrating an example of a checkout system according to an embodiment.
Figure 2:
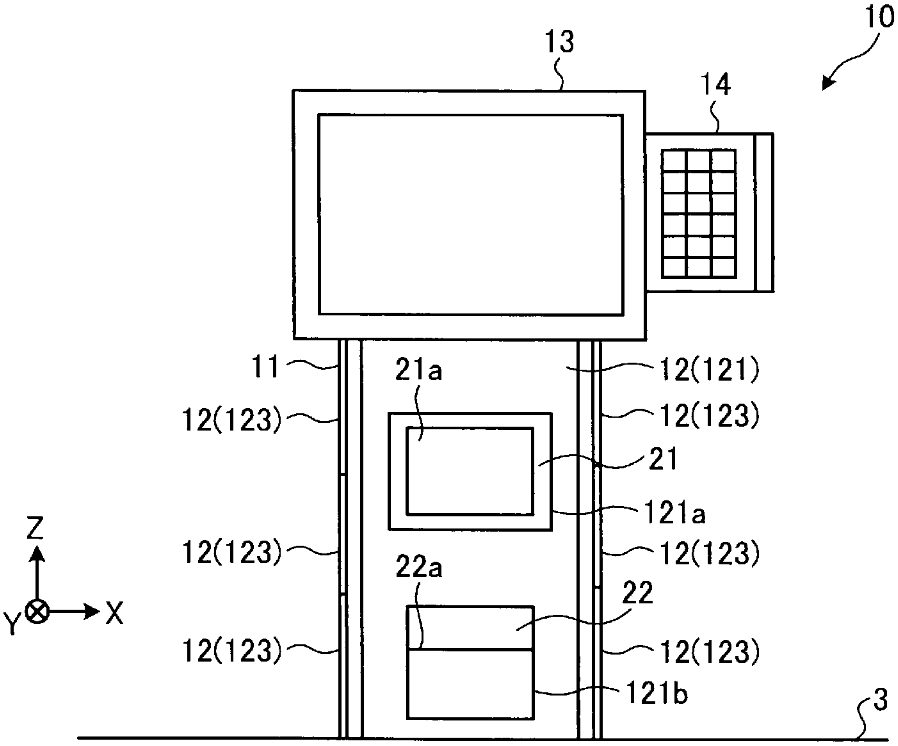
FIG. 2 is a view of a sales registration apparatus from a front side.
Figure 3:
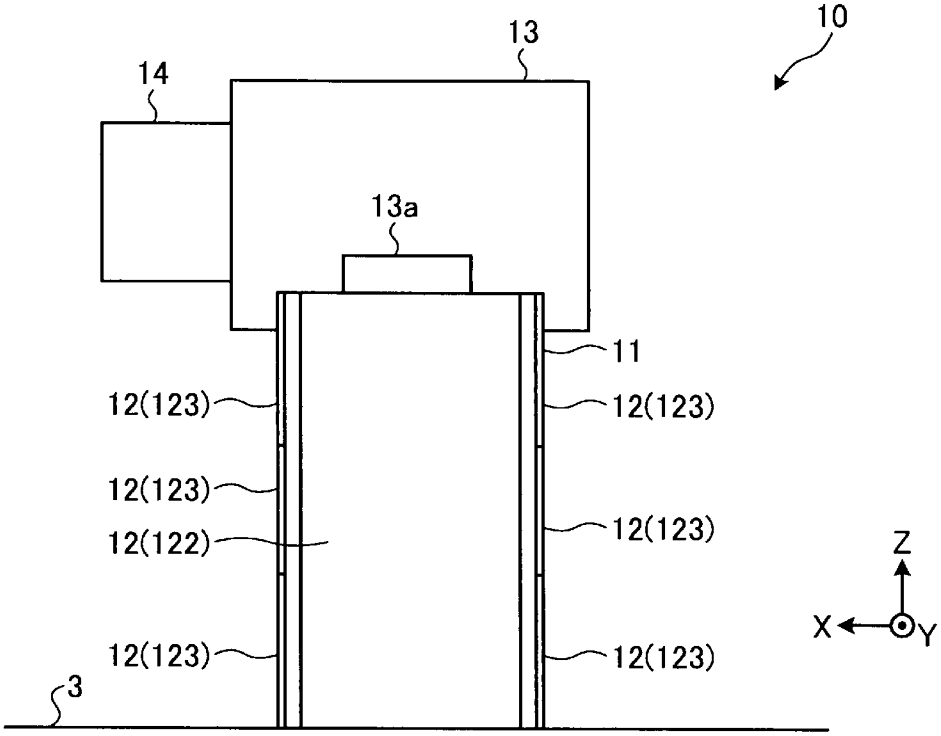
FIG. 3 is a view of a sales registration apparatus from a back side.

FIG. 1 is a perspective view illustrating an example of a checkout system 1 according to an embodiment. FIG. 2 is a view of a sales registration apparatus 10 illustrated in FIG. 1 viewed from the front side (an operator side). FIG. 3 is a view of the sales registration apparatus 10 illustrated in FIG. 1 viewed from the back side (a customer side).

The checkout system 1 includes a checkout counter 2 having a laterally long table shape. A flat loading surface 3 is formed on the upper surface of the checkout counter 2. A shopping basket (not illustrated in FIG. 1) or the like that stores commodities can be placed on the loading surface 3.

The sales registration apparatus 10 is set in a substantially center region along the longitudinal direction of the checkout counter 2. The sales registration apparatus 10 is a vertical-type scanner apparatus (a vertical scanner). The sales registration apparatus 10 is located on the far side of the checkout counter 2 as viewed from an operator side. The sales registration apparatus 10 is communicably connected to an external apparatus such as a settlement terminal (not illustrated in FIG. 1).

The sales registration apparatus 10 comprises a housing 11 disposed on the loading surface 3. The housing 11 houses various devices related to the operation of the sales registration apparatus 10. The housing 11 includes, for example, a reading section 21 and a printer section 22 on the inside.

The reading section 21 is a reading device that reads, via a reading window 21*a*, information concerning a commodity, such as a code symbol attached to the commodity or other characteristic of the commodity for registration of the commodity in a sales transaction. The reading section 21 includes a light that emits reading light through the reading window 21*a*, an image sensor that receives reflected reading light, and a decoder that executes decode processing concerning an output signal of an image sensor.

The printer section 22 is a printer device that prints (issues) a printout such as a receipt. The printer section 22 includes a paper storing section for storing paper or the like, a conveying section that conveys the paper stored in the paper storing section to a paper discharge port 22*a*, and a printing section that performs printing on the paper conveyed to the paper discharge port 22*a*.

A panel section 12 (comprising a front panel 121, a back panel 122, and a side panel 123) is detachably attached to outer surfaces (the front surface, the back surface, and the side surface) of the housing 11. The panel section 12 is an example of a cover section or a cover member that covers the surface of the housing 11. The panel section 12 can be formed of resin panels or the like. In the front panel 121 attached to the front side of the housing 11, opening sections 121*a* and 121*b* are provided such that the front surface of the housing 11 can be covered in a state in which the front surfaces of the reading section 21 and the printer section 22 are exposed.

A display section 13 is attached to an upper part of the housing 11. The display section 13 is a display device including a display such as a liquid crystal display. The display section 13 is provided to extend towards the operator side beyond the front surface of the housing 11. A front portion of the display section 13 is inclined downward. The display section 13 is used as a display for an operator who operates the sales registration apparatus 10. The display section 13 may have a touch panel configuration. The display section 13 may include a power supply unit of the sales registration apparatus 10 and a control unit of the sales registration apparatus 10 comprising a CPU (Central Processing Unit), a ROM (Read Only Memory), and a RAM (Random Access Memory).

An operation input section 14 is provided adjacent to the display section 13. In FIG. 1, the operation input section 14 is provided on the right of the display section 13 when viewed from the operator side. The operation input section 14 includes an input device such as a keyboard or keypad.

On the loading surface 3, a through-hole is formed into which foot sections 113 (see FIG. 4) of the housing 11 are inserted. By inserting the foot sections 113 into the through-hole of the loading surface 3, the housing 11 is fixed to the loading surface 3. The height of the sales registration apparatus 10 on the loading surface 3 is desirably set to approximately the eye-level of the operator.

The configuration of the sales registration apparatus 10 is not limited to the example explained above. For example, the sales registration apparatus 10 may also include a display section for the customer (a customer display section), a display screen of which is directed to the back side of the sales registration apparatus 10. The customer display section can be attached to, for example, the back of the display section 13 or at a position adjacent to the display section 13 (e.g., a position opposite to the operation section 14).

Figure 4:
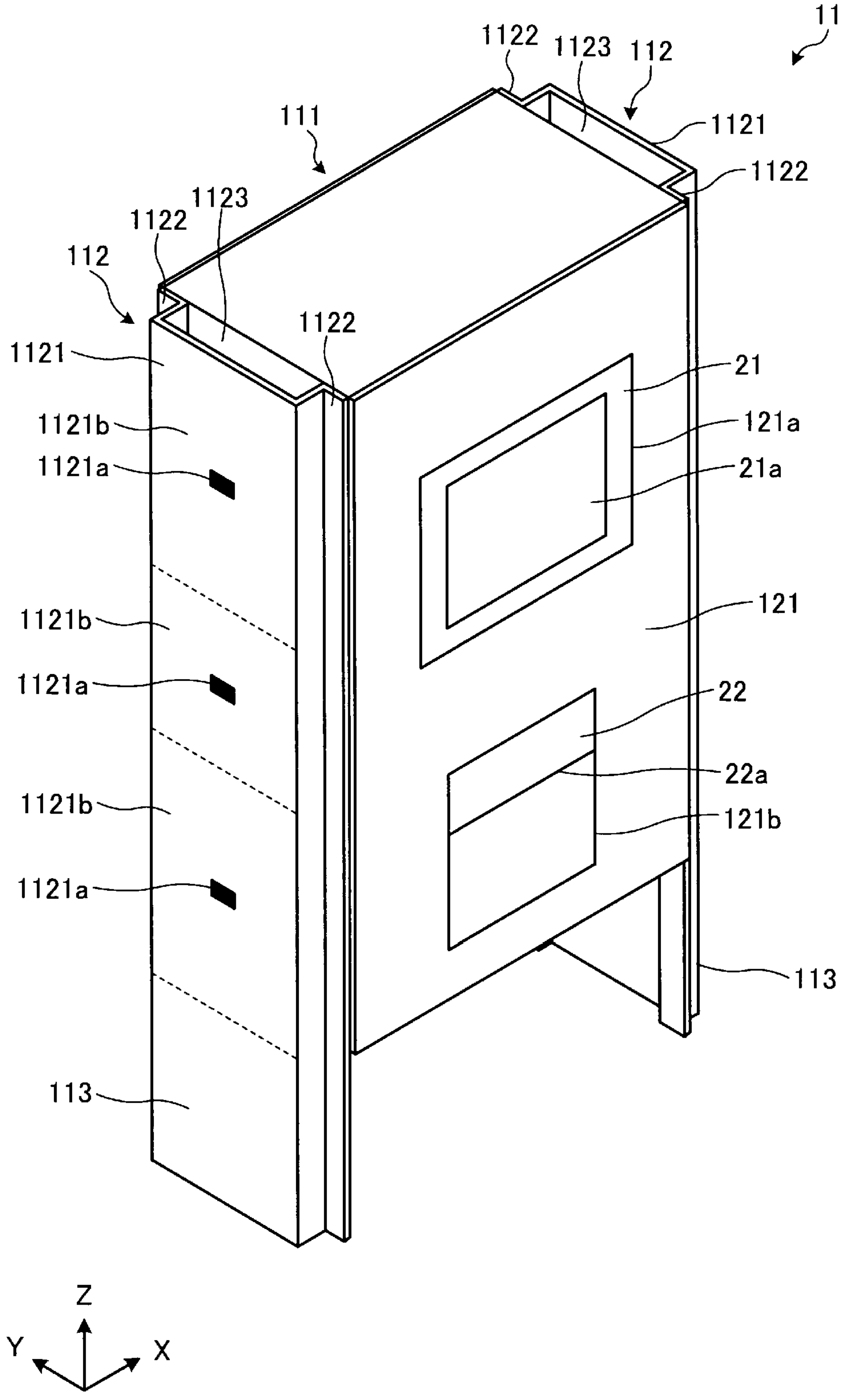
FIG. 4 is a perspective view illustrating an example of the configuration of a housing.

The configuration of the sales registration apparatus 10, more specifically the housing 11, is explained with reference to FIG. 4. FIG. 4 is a perspective view illustrating an example of the configuration of the housing 11. In FIG. 4, a state is illustrated in which the side panel 123, the display section 13, and the operation section 14 have been removed from the sales registration apparatus 10.

As illustrated in FIG. 4, the housing 11 includes a main body section 111 and supporting sections 112. The main body section 111 has a substantially box-like shape long in the height direction (a Z direction) as a whole. The main body section 111 houses devices such as the reading section 21 and the printer section 22 on the inside.

The devices housed by the main body section 111 are not limited to the reading section 21 and the printer section 22. The main body section 111 may house a control unit, a power supply unit, and the like of the sales registration apparatus 10. The display section 13 is attached to the upper surface of the main body section 111. Specifically, the display section 13 is attached to the upper surface of the main body section 111 using, for example, a holder 13*a* (see FIG. 3) including a tilt mechanism and the like.

The supporting sections 112 are attached to both side portions (side surfaces) of the main body section 111. The supporting sections 112 are horseshoe-shaped in a cross section cutting across the height direction of the main body section 111. The supporting sections 112 are formed by, for example, a metal plate. The supporting sections 112 support the main body section 111 from both the side surfaces.

Specifically, the supporting sections 112 include side surface sections 1121, a cross section of which has a substantial C shape, and extended sections 1122 extended toward the outer side from both ends of the side surface sections 1121. The side surface sections 1121 are parts forming side surfaces of the housing 11 when the supporting sections 112 are attached to the main body section 111. The extended sections 1122 are parts joined to the main body section 111 when the supporting sections 112 are attached to the main body section 111. The size in the width direction (a Y direction) of the supporting sections 112 is substantially equal to the size in the depth direction of the main body section 111. The size in the height direction (a Z direction) of the supporting sections 112 is set longer than the size in the height direction of the main body section 111.

The supporting sections 112 are fixed (joined) to the side surfaces of the main body section 111 by welding, screwing, or the like. Specifically, in a state in which the upper ends of the supporting sections 112 are aligned at a height substantially equal to the upper surface of the main body section 111, the extended sections 1122 provided at both ends of the side surface sections 1121 are joined to the side surfaces of the main body section 111. That is, the supporting sections 112 are attached such that recessed sides of C-shaped cross sections are opposed to the side surfaces of the main body section 111.

Lower end portions of the supporting sections 112, that is, portions of the supporting sections 112 projecting from the lower surface of the main body section 111 are considered to be the foot sections 113 of the housing 11. The foot sections 113 are inserted into the through-hole of the loading surface 3. Consequently, the supporting sections 112 are fixed to the loading surface 3 or the checkout counter 2 more broadly.

By integrating the main body section 111 and the supporting sections 112, gaps 1123 providing wiring paths are formed along the height direction of the main body section 111 between the side surfaces of the main body section 111 and the side surface sections 1121. The gaps 1123 can be connected to cable holes on the side surfaces of the main body section 111. Consequently, wiring between the main body section 111 and the display section 13 can be provided through the gaps 1123.

Attachment sections 1121*a* to which the side panels 123 can be detachably attached are provided on the side surface sections 1121 of the supporting sections 112. The attachment sections 1121*a* are, for example, locking holes (recessed sections) having a snap-fit structure. The attachment sections 1121*a* are provided for each of attachment regions 1121*b* to which the side panels 123 are attached. In FIG. 4, the attachment regions 1121*b* are indicated by broken lines. An example in which the side surface section 1121 is divided into three attachment regions 1121*b* is illustrated.

The attachment regions 1121*b* are small regions provided for attachment of the side panels 123. The side surface section 1121 of the main body section 111, to which the side panels 123 are attached is divided along the height direction to form the attachment regions 1121*b*. The sizes of the attachment regions 1121*b* correspond to the sizes of the side panels 123 attached to the attachment regions 1121*b*. That is, in FIG. 4, to three attachment regions 1121*b* set on the side surface section 1121, three side panels 123 corresponding to the sizes of the attachment regions 1121*b* are attached. Among the three attachment regions 1121*b*, the sizes of an upper stage and a lower stage are the same. The size of a middle stage is smaller than the upper stage (and the lower stage).

Specific positions where the attachment sections 1121*a* are set in the attachment regions 1121*b* and the number of the attachment sections 1121*a* do not particularly matter. However, the attachment sections 1121*a* may be preferably set in positions where even if the tops and the bottoms of the side panels 123 were reversed, the attachment sections 1121*a* can still be attached in the same state as a state before the reversal. Specifically, the attachment regions 1121*b* are set in centers of the attachment regions 1121*b* or positions point-symmetrical with respect to the centers. The number of the attachment regions 1121*b* is two or more. At least two attachment regions 1121*b* having the same size are present.

Figure 5:
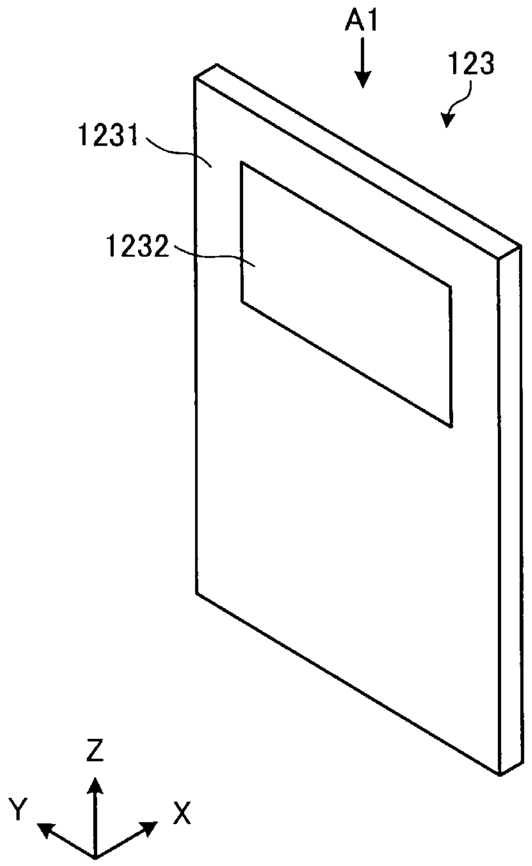
FIG. 5 is a perspective view illustrating an example of an exterior configuration of a side panel according to an embodiment.
Figure 6:
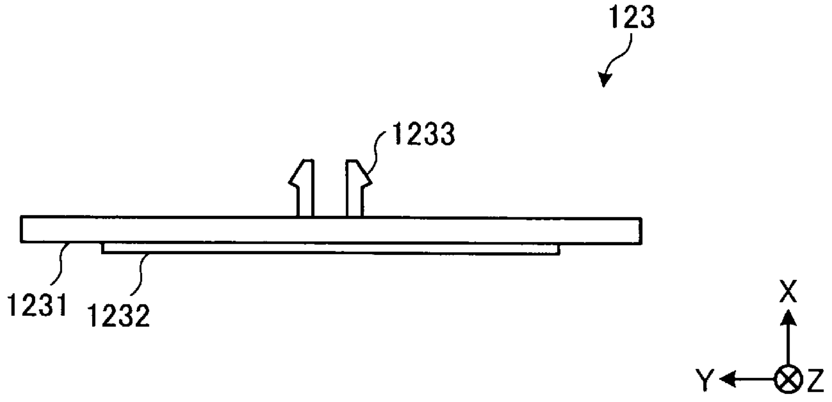
FIG. 6 is a view of a side panel.

The side panel 123 is explained with reference to FIGS. 5 and 6. FIG. 5 is a perspective view illustrating an example of the side panel 123 . FIG. 6 is a view of the side panel 123 illustrated in FIG. 5 viewed from an A1 direction.

The side panel 123 is an example of a cover section. If the side panel 123 is attached to the supporting section 112, the side panel 123 includes, as a principal plane, a panel surface 1231 serving as a side surface of the housing 11.
The panel surface 1231 is formed in size substantially equal to the attachment region 1121*b*. A metal plate 1232 of a ferromagnetic material is attached to a part of a region of the panel surface 1231. The metal plate 1232 is used to post a notice or the like using a magnet when the side panel 123 is attached to the side surface section 1121 of the supporting section 112.

In FIG. 5, the metal plate 1232 is disposed in a position close to one side of two sides in a long side direction of the panel surface 1231. However, a position of the metal plate 1232 is not limited to this. The metal plate 1232 may be disposed in the center of the panel surface 1231. The metal plate 1232 may be disposed over the entire surface of the panel surface 1231.

An attachment section 1233 is provided on the rear surface side of the panel surface 1231. The attachment section t 1233 is, for example, a hook structure or a projecting section permitting a snap-fit attachment of. The attachment section 1233 can be detachably engaged with the attachment section 1121*a* of the supporting section 112.

A position where the attachment section 1233 is set and the number of attachment sections 1233 does not particularly matter. However, the attachment sections 1233 are provided in positions corresponding to the attachment sections 1121*a* of the supporting section 112. When the side panel 123 is attached, the attachment section 1233 is positioned so the panel surface 1231 and an attachment region 1121*b* substantially coincide. The attachment section 1233 is set in a part where, if the top and the bottom of the side panel 123 are reversed, the attachment section 1233 can still be attached in the same state as a state before the reversal. Specifically, the attachment section 1233 may be set in the center of the panel surface 1231 and parts point-symmetrical with respect to the center.

The side panels 123 are prepared in a number equal to the number of the attachment regions 1121*b* in the side surface section 1121. For example, in the configuration illustrated in FIG. 4, three attachment regions 1121*b* are on the side surface section 1121. Therefore, three side panels 123 corresponding to the sizes of the attachment regions 1121*b* are prepared. By attaching the three side panels 123 to the attachment regions 1121*b* having corresponding sizes, the side surface of the housing 11 (the main body section 111) can be covered by the side panels 123.

The metal plate 1232 may be attached to all the side panels 123 or may be attached to only one or other subset of the side panels 123. In the latter case, the metal plate 1232 is attached to at least any one of a plurality of side panels 123 including the panel surfaces 1231 having the same size.

Figure 7:
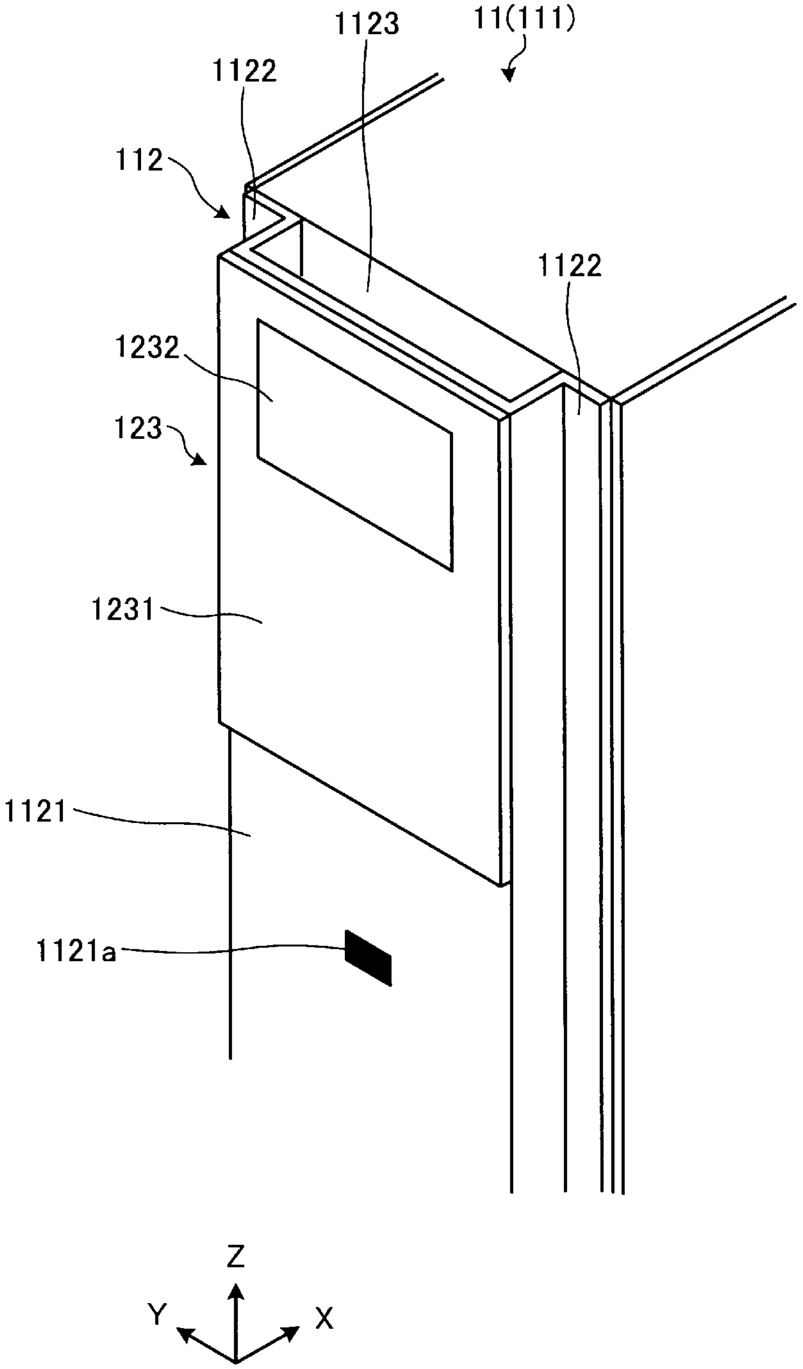
FIG. 7 is a perspective view illustrating an example of a side panel attached to a supporting section.
Figure 8:
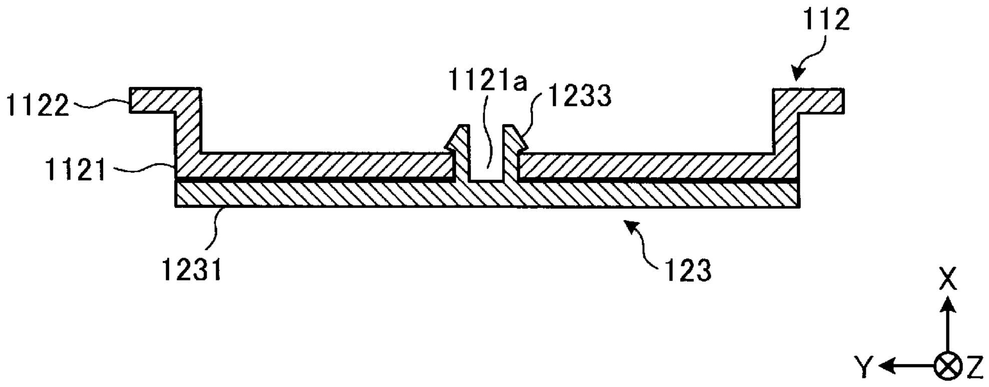
FIG. 8 is a diagram schematically illustrating an example of a cross section of a supporting section and an attachment portion of a side panel.

An attachment method of the side panel 123 is explained. FIG. 7 is a perspective view illustrating an example of a state in which the side panel 123 is attached to the supporting section 112 illustrated in FIG. 4. FIG. 8 is a diagram schematically illustrating an example of a cross section of an attachment portion of the supporting section 112 and the side panel 123.

As illustrated in FIG. 7, the side panel 123 is attached to the side surface section 1121 in a state in which the panel surface 1231 is directed to the outer side of the housing 11 (the main body section 111). At this time, the attachment section 1233 provided on the rear surface side of the panel surface 1231 is locked by the attachment section 1121*a* of the side surface section 1121 (see FIG. 8).

FIG. 8 illustrates an example in which the attachment section 1121*a* and the attachment section 1233 are formed in a snap-fit structure. As illustrated in FIG. 8, the attachment section 1233 of the side panel 123 includes a projecting section. By fitting and hooking the projecting section in the recessed section of the attachment section 1121*a*, the side panel 123 is attached to the supporting section 112. If the side panel 123 is to be detached from the supporting section 112, the projecting section of the attachment section 1233 can be detached from the recessed section of the attachment section 1121*a* by applying a force to the projecting section of the attachment section 1233 in the center direction of the attachment section 1121*a*. Consequently, the side panel 123 is detachably attached to the side surface of the housing 11.

As illustrated in FIGS. 9 to 12, a plurality of side panels 123 are attached along the height direction of the side surface of the housing 11 to cover the side surface. FIGS. 9 to 12 are diagrams schematically illustrating an example of the side surface of the sales registration apparatus 10, and more particularly, the housing 11, to which the side panels 123 are attached. In FIGS. 9 to 12, an example is illustrated in which the three attachment regions 1121*b* explained with reference to FIG. 4 are set on the side surface (the side surface section 1121) of the housing 11.

Figure 9:
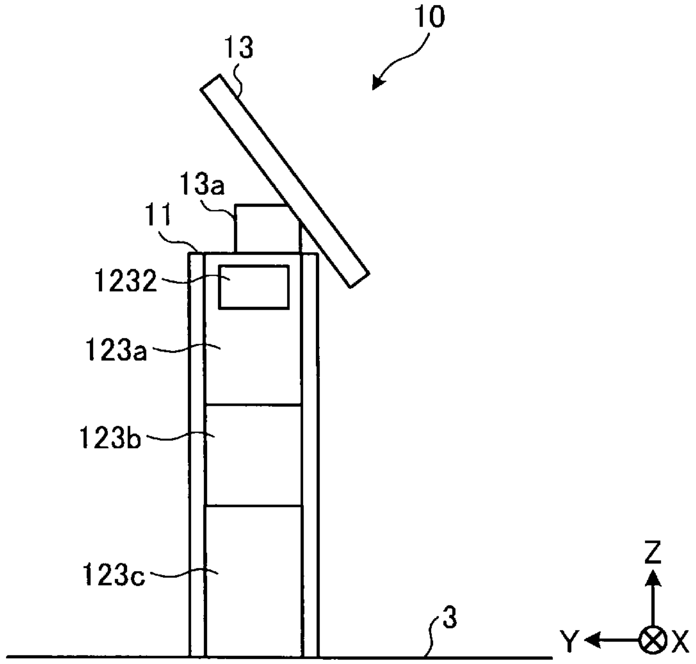
FIG. 9 is a diagram schematically illustrating a side surface of a sales registration apparatus to which a side panel is attached.

As illustrated in FIGS. 4 and 9, three side panels 123 (123*a*, 123*b*, 123*c*) are attached to the attachment regions 1121*b*. Specifically, a side panel 123*a* corresponding to the size of the attachment region 1121*b* at an upper stage is attached to the attachment region 1121*b* at the upper stage. A side panel 123*b* corresponding to the size of the attachment region 1121*b* at a middle stage is attached to the attachment region 1121*b* at the middle stage. A side panel 123*c* corresponding to the size of the attachment region 1121*b* at a lower stage is attached to the attachment region 1121*b* at the lower stage. Consequently, the side surface of the housing 11 is covered by the three side panels 123*a*, 123*b*, and 123*c*.

The side panel 123*a* and the side panel 123*c* have an equal size of panel surface 1231. However, a metal plate 1232 is provided on the side panel 123*a*. That is, in the sales registration apparatus 10 to which the side panel 123*a* is attached, it is possible to post a notice or the like on the side surface of the housing 11 (the main body section 111) by using the metal plate 1232 and a magnet.

Figure 10:
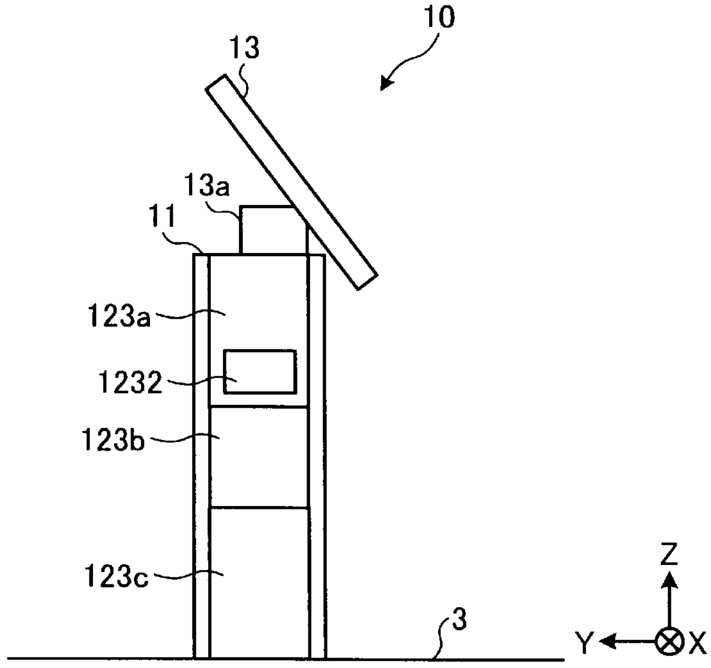
FIG. 10 is a diagram schematically illustrating an example of a side surface of a sales registration apparatus to which a side panel is attached.

If the setting height of the metal plate 1232 is to be reduced according to an environment of use or the like, a layout illustrated in FIG. 10 can be formed by reversing the top and the bottom of the side panel 123*a* from that illustrated in FIG. 9. FIG. 10 illustrates a state in which the top and the bottom of the side panel 123*a* illustrated in FIG. 9 have been reversed. As illustrated in FIG. 10, the setting height of the metal plate 1232 on the side surface of the housing 11 is lower than the setting height in the state illustrated in FIG. 9 because the top and the bottom of the side panel 123*a* have been reversed.

Figure 11:
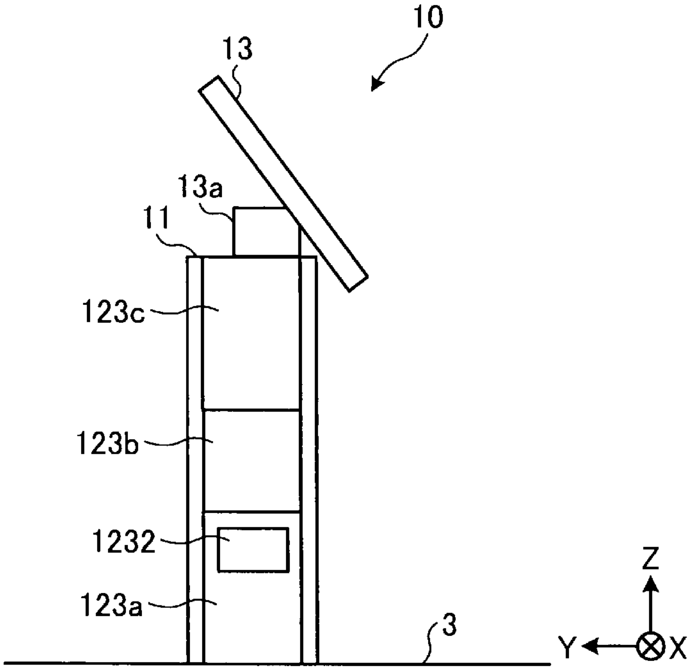
FIG. 11 is a diagram schematically illustrating an example of a side surface of a sales registration apparatus to which the side panel is attached.

If the setting height of the metal plate 1232 is to be further reduced, a layout illustrated in FIG. 11 can be formed by switching the side panel 123*a* and the side panel 123*c* (which have the same size) from the configuration illustrated in FIG. 9. As illustrated in FIG. 11, the setting height of the metal plate 1232 on the side surface of the housing 11 is lower than the setting height in the state illustrated in FIG. 10 (or FIG. 9) due to the switching of the positions of side panel 123*a* and side panel 123*c*.

Figure 12:
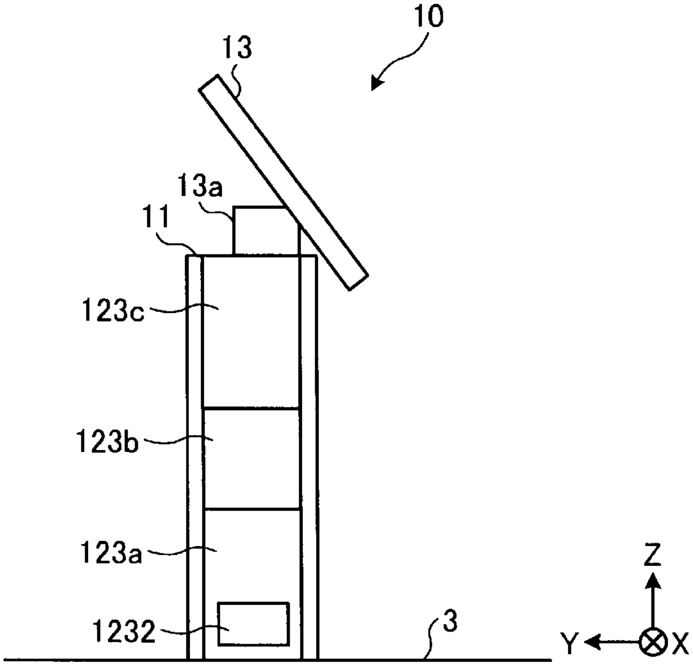
FIG. 12 is a diagram schematically illustrating an example of a side surface of a sales registration apparatus to which a side panel is attached.

If it is desired to further reduce the setting height of the metal plate 1232 from that illustrated in FIG. 11, the layout illustrated in FIG. 12 can be formed by reversing the top and the bottom of the side panel 123*a* from that depicted in FIG. 11. As illustrated in FIG. 12, the setting height of the metal plate 1232 on the side surface of the housing 11 is lower than the setting height in the state illustrated in FIG. 11 because the top and the bottom of the side panel 123*a* have been reversed.

As explained above, the side surface of the housing 11 (the main body section 111) of the sales registration apparatus 10 is divided into the attachment regions 1121*b* corresponding to the sizes of the side panels 123. The side surface of the housing includes at least two attachment regions 1121*b* having the same size. The sales registration apparatus 10 includes, for each of the attachment regions 1121*b*, the attachment section 1121*a* to which the side panel 123 can be detachably attached on the side surface of the housing 11 (the main body section 111). In the sales registration apparatus 10, a side panel 123 corresponding to the size of the attachment region 1121*b* can be attached to each of the attachment regions 1121*b*. Consequently, in the sales registration apparatus 10, since the side panels 123 having the same size can be interchanged, it is possible to improve flexibility of a layout of the side panels 123.

In the sales registration apparatus 10, the attachment sections 1121*a* are set in the centers of the attachment regions 1121*b* or parts point-symmetrical with respect to the centers. Consequently, in the sales registration apparatus 10, the side panels 123 can be attached in a state in which the tops and the bottoms of the side panels 123 are reversed. Therefore, it is possible to improve flexibility of a layout of the sales registration apparatus 10.

Further, in the sales registration apparatus 10, a metal plate 1232 can be attached to any one of the side panels 123. Consequently, in the sales registration apparatus 10, the setting height of the metal plate 1232 on the side surface of the housing 11 can be adjusted according to a layout change of the side panels 123. Therefore, it is possible to achieve improvement of convenience.

In one example, the metal plate 1232 is attached to the panel surface 1231 of the side panel 123. However, in other examples, an accessory other than a metal plate 1232 may be attached to the panel surface 1231. For example, a side panel 123 may include as an accessory, on the panel surface 1231 a hook for hanging and holding a register bag or the like, a white board, or the like.

Furthermore, the cross-sectional shape of the supporting sections 112 is not limited to the above-described example embodiment. For example, the supporting sections 112 may comprise tubular member such as a square pipe or the like having a hollow region on the inside. In this case, the cross-sectional shape of the supporting sections 112 does not particularly matter so long as the supporting sections 112 have a shape to which the main body section 111 and the side panel 123 can be attached. The supporting sections 112 may include through-holes communicating with cable holes on the side surfaces of the main body section 111. The supporting sections 112 include, the above-described attachment sections 1121*a* and the like on the surface sides serving as the side surfaces of the housing 11. Consequently, the gaps 1123 can be formed between the supporting sections 112 and the main body section 111 by inclusion of hollow regions in the supporting sections 112.

In the above-described examples, the panel surface 1231 of the side panels 123 is a flat surface. However, the panel surface 1231 may be a surface on which a groove or the like is cut, a curved surface, or the like.

While certain example embodiments have been explained above, the present disclosure is not limited to these examples. Various changes, substitutions, additions, combinations, and the like can be made without departing from the spirit of the present disclosure.

What is claimed is:

1. A sales registration apparatus, comprising:

a reader configured to read information from a commodity;

a main body on an upper surface of a checkout counter and housing the reader, the main body comprising a plurality of side surface regions distributed adjacently along a side surface in a height direction of the main body;

a plurality of cover sections including panel surfaces having a planar dimension substantially matching a planar dimension of least one of the plurality of side surface regions; and an attachment section in each of the plurality of side surface regions of the main body and configured to permit attachment of a corresponding cover section in the plurality of cover sections in a detachable manner, wherein at least two of the side surface regions have a same size such that a cover section matching one of the at least two side surface regions will also match the other of the at least two side surface regions, the plurality of cover sections include at least two cover sections having a same panel surface size, and an accessory is attached to the panel surface of at least one of these at least two cover sections.

2. The sales registration apparatus according to claim 1, wherein each attachment section is in a center of each respective one of the side surface regions, and each of the cover sections can be attached in either of an upwards orientation and a downwards orientation using the attachment section.

3. The sales registration apparatus according to claim 1, wherein each attachment section is in a center of each respective one of the side surface regions or in positions in each one of the respective side surface regions that are point-symmetrical about the center, and each of the cover sections can be attached in either of an upwards orientation and downwards orientation using the attachment section.

4. The sales registration apparatus according to claim 1 wherein the accessory is offset in a longitudinal direction from a center of the panel surface to which it is attached, the longitudinal direction corresponding to the height direction of the main body when the cover section is attached to an attachment section.

5. The sales registration apparatus according to claim 4, wherein the accessory is a metal plate.

6. The sales registration apparatus according to claim 1 wherein the accessory is a metal plate.

7. The sales registration apparatus according to claim 1, wherein the cover sections include snap-fit attachment structures permitting the attachment to an attachment section.

8. The sales registration apparatus according to claim 1, wherein the panel surfaces of the plurality of cover sections comprise a resin material.

9. The sales registration apparatus according to claim 1, wherein the panel surfaces of the plurality of cover sections are substantially flat.

10. The sales registration apparatus according to claim 1, wherein the accessory is a ferromagnetic plate at or adjacent to the panel surface of the at least one of the at least two cover sections.

11. A sales registration apparatus to be mounted on a checkout counter, the sales registration apparatus comprising:

a main body configured to be mounted on an upper surface of a checkout counter and having:

an interior space for receiving a reader for reading information from a commodity, a side surface comprising a first region to be adjacent to the upper surface of the counter top, a second region adjacent to the first region in a vertical direction orthogonal to the upper surface of the counter top, and a third region adjacent to the second region in the vertical direction, wherein the first region has a planar dimension substantially equal to a planar dimension of the third region, and each of the first, second, and third regions has an attachment section therein;

a first cover section with a panel surface having a planar dimension substantially equal to the planar dimension of the first region and attached in a detachable manner to the attachment section of one of the first region or the third region;

a second cover section with a panel surface having a planar dimension substantially equal to the planar dimension of the second region and attached to the attachment section of the second region; and a third cover section with a panel surface having a planar dimension substantially equal to the planar dimension of the third region and attached in a detachable manner to the attachment section of the other one of the first region or the third region to which the first cover section is not attached, the third cover section comprising an accessory located at a position offset from a center of the panel surface along the vertical direction.

12. The sales registration apparatus according to claim 11, wherein the accessory is a ferromagnetic plate.

13. The sales registration apparatus according to claim 11, wherein the third cover section can be mounted to the attachment sections in either one of an upwards orientation or a downwards orientation.

14. The sales registration apparatus according to claim 11, wherein the first cover section is attached to the attachment section in the third region.

15. The sales registration apparatus according to claim 11, wherein the first cover section is attached to the attachment section in the first region.

16. The sales registration apparatus according to claim 11, further comprising:

a display mount on an uppermost end in the vertical direction of the main body.

17. The sales registration apparatus according to claim 11, wherein the panel surface of the first cover section is substantially rectangular.

18. The sales registration apparatus according to claim 11, wherein the panel surface of the first cover section is substantially flat.

19. The sales registration apparatus according to claim 11, wherein the second cover section is attached in a detachable manner to the attachment section of the second region.

* * * * *